Oct. 29, 1929.                J. S. CROSSLEY                1,733,944
                     SECONDARY CELL AND PARTS THEREOF
                            Filed Nov. 26, 1926
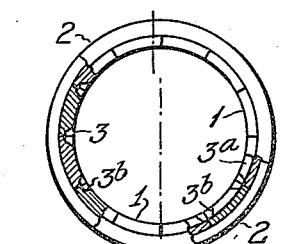
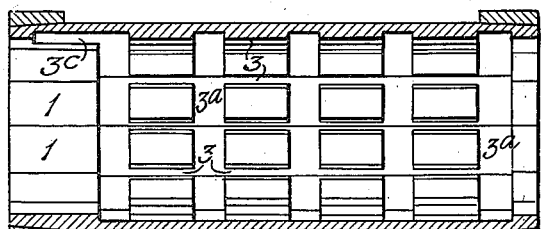
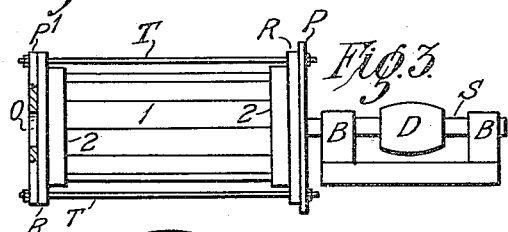
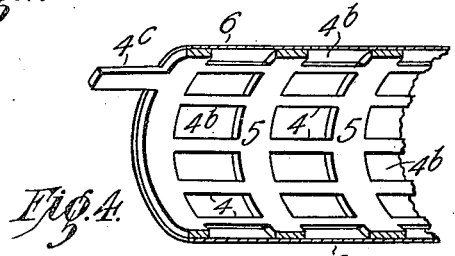
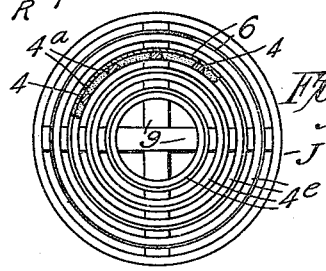
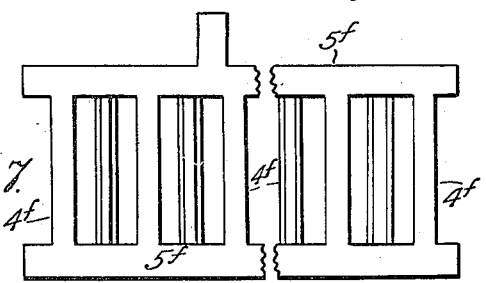
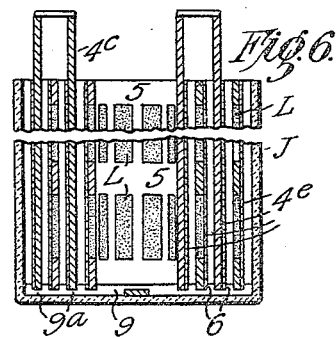
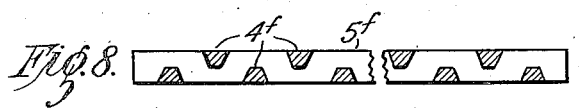
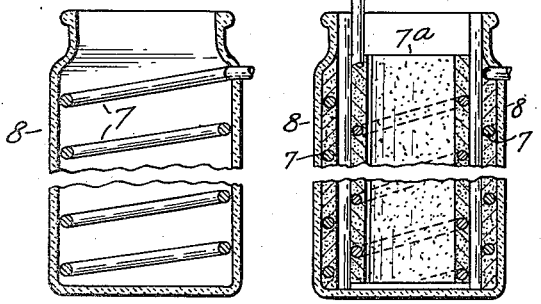
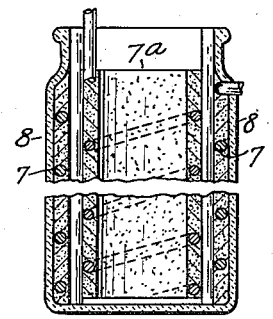
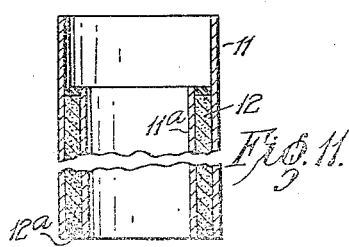
J. S. Crossley
Inventor
By: Marks & Clerk
Attys.

Patented Oct. 29, 1929

1,733,944

UNITED STATES PATENT OFFICE

JAMES STANLEY CROSSLEY, OF MOONEE PONDS, VICTORIA, AUSTRALIA

SECONDARY CELL AND PARTS THEREOF

Application filed November 26, 1926, Serial No. 150,956, and in Australia December 1, 1925.

My invention relates to secondary electric cells or accumulators, its objects including to provide therefor an improved element, and method of making it, and of depositing suitable materials, one of which is lead paste.

Another object is to secure an unusually high discharge rate without damaging the cell plates.

By this invention I aim at producing cells which are more efficient, more durable, and relatively less expensive.

I produce an element which has a cylindrical or curved grid. To form a cell, several elements, divided by separators, are nested one within the other.

In the process of manufacture of my element I use a mould which in one case is cylindrical and has a series of areas or spaces in which, by centrifugal action, I cause deposition of material which forms the grid. Or I take flat material and curve it into a desired form. Or I employ a grid of wire or of strip material supported by the wall of a container which acts also as the mould. By using centrifugal action to locate the lead paste or equivalently usable material in the grid, I produce a consolidation which is distinguished by material advantage.

In some cases my grid has an outer wall which also functions as a separator.

The construction of my elements and cells embodying the same will now be explained with the aid of the accompanying drawings; but modifications will be apparent to those skilled in the art, while retaining matter which is within the scope of one or more of my claims.

In the drawings,

Figure 1 is an end view of a mould, with parts in section to show segments.

Figure 2 is a side sectional view on line $F^2$ of Figure 1.

Figure 3 is a diagram showing on a small scale, a moulding machine and mould.

Figure 4 is a fragmentary perspective sectional view of a grid, having an outer separator.

Figure 5 is a plan of my improved cell.

Figure 6 is a vertical section of the said cell.

Figure 7 is a face view of a flat member which when curved becomes a cylindrical grid.

Figure 8 is a sectional plan of Figure 7.

Figure 9 is a sectional view of a container enclosing a wire grid.

Figure 10 is a sectional view of my cell containing a grid of wire embedded in centrifugally deposited material and having a cylindrical inner element having a grid of wire also embedded in material deposited centrifugally.

Figure 11 is a sectional view of an element usable in an alkaline cell.

To form a mould I take suitable strips 1 each arcuate in cross section for example, which when assembled form a hollow body, the assembly being retained by suitable means shown as encircling rings 2. Rings R locate the mould. This is usable in a spinning machine, which I by way of example, show as having a mould carrier which has end plates P, $P^1$ connected by spacing rods T.

The spinning machine shaft S supported in bearings B, and having a drive pulley D, carries plates P, $P^1$, the latter being apertured, the aperture O allowing of introduction of material to be moulded. The shapes and sizes of moulds will vary according to the grid desired. Other forms of spinning machines are obviously usable.

The mould illustrated has suitable recesses 3, and has grooves $3^a$ of suitable arc which may be completely circumferential to form any predetermined number of grid bands 5 and bars 4.

The recesses 3 have faces $3^b$ to form, on bars 4, faces $4^a$ which are adapted to key paste or other material in the grid, and which are shown inclined. I form a lug $4^c$ on the grid by recessing the mould as shown at $3^c$.

Between the bars 4 are gaps $4^b$ having any predetermined positions and dimensions, the bands 5 being therefore also as predetermined; that is, the sizes of grid parts are to be varied to meet different practical requirements.

To proceed to use the mould I heat it in suitable cases, and rotate it rapidly, and feed into it suitable material, for example molten lead which travels into and fills the recesses in the mould thus forming a grid. When sufficient material has been fed into the mould and has set, rotation is stopped and the grid thus made is removed.

The flat member in Figures 7 and 8 has any predetermined bands $5^t$, and bars $4^t$, and when given a cylindrical form becomes a grid.

Externally of the grid I combine with it a shell or wall 6 of suitable material, for example asbestos sheeting soaked in silicate of soda, wrapped round the grid and then dipped in suitable acid, as sulphuric acid to precipitate the silica and bind the whole together, so that the shell 6 becomes a grid separator.

Or the separator is formable by enclosing the grid in a cylinder of suitable material, as asbestos, pulp or the like produced by centrifugal deposition, or in other suitable manner.

In order to fill its gaps or recesses, the grid is located in a separator 6, or any suitable shell which may be temporary, and is rotated in a moulding machine while suitable material L, herein referred to as lead paste, is fed thereto, until the said gaps or recesses are packed,—the surface produced being by obvious means made as smooth as desired.

I produce the lead paste in one case, by utilizing electrically precipitated metallic lead, which I have discovered to be particularly advantageous. For example lead thus precipitated and mixed with litharge or red lead and lead wool forms a most effective compound, in making which, however, detail variations are usable.

In Figures 5 and 6, $4^e$ represent complete elements, that is filled grids, of which several of different diameters having means of separation are nested together in a container J shown as a jar to form a cell.

The container is shown with a support 9, having grooves $9^a$ in which are fitted ends of elements so that they are kept separate. As a modification, Figure 10 shows separators consisting of rods 10 of suitable material as glass.

To produce an element in which the grid is strip material 7, wire for example of suitable form, shown as coiled, this strip is set within the mould before rotation of the latter as aforesaid. In some cases a shell 8 may be the mould, and be of jar form for further use as part of the cell.

The strip is in effect a cage or skeleton 7 and when embedded in material $7^a$, Figure 10, a cylindrical element is produced.

My invention is not limited to producing lead grids filled with lead or other suitable paste, but is applicable to the utilization of other combinations of metals, as zinc and lead; copper and lead; copper and zinc; nickel and iron; and so on, with in each case suitable electrolytes.

In using in combination nickel and iron, instead of a metal grid formed contrifugally, I use (as shown in Figure 11) nested cylinders 11, $11^a$, of carbon or like suitable material between which is a wall 12 composed of nickel oxide for example, and positioned suitably as by sealing material $12^a$.

I form the said carbon cylinders contrifugally by depositing a mixture of carbon, a binder and liquid in a mould or casing and rotating it. The said casing may be destructible by baking. The material 12 is then deposited centrifugally on cylinder 11, after which the inner cylinder $11^a$ is positioned.

I claim:—

1. The process of forming electrode elements for secondary cells which comprises centrifugally depositing grid material in a mold, so shaped as to give the formed grid a recessed structure and thereafter centrifugally depositing grid paste material in the recesses of the grid.

2. In the process of forming electrode elements for secondary cells, the steps which comprise feeding molten metal into a rotating recessed mold to centrifugally deposit said metal in the recesses of the mold and form a grid and filling in the recesses in the so formed grid with grid paste material.

3. In the process of forming electrode elements for secondary cells, the steps which comprise feeding molten metal into a rotating recessed mold to centrifugally deposit said metal in the recesses of the mold and form a grid and centrifugally depositing grid paste material in the recesses of the so formed grid.

4. The process of forming electrode elements for secondary cells which comprises centrifugally depositing grid paste material in the recesses of a recessed grid element.

In witness whereof I have hereunto set my hand.

JAMES STANLEY CROSSLEY